Dec. 12, 1967     W. E. BEANEY     3,357,082
METHOD OF MAKING A TURBINE WHEEL
Filed Feb. 13, 1963     2 Sheets-Sheet 1

*INVENTOR.*
WALTER E. BEANEY

BY McCormick, Paulding & Huber

ATTORNEYS

Dec. 12, 1967    W. E. BEANEY    3,357,082
METHOD OF MAKING A TURBINE WHEEL
Filed Feb. 13, 1963    2 Sheets-Sheet 2
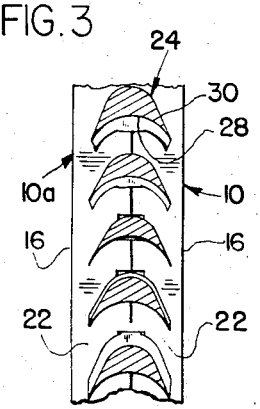
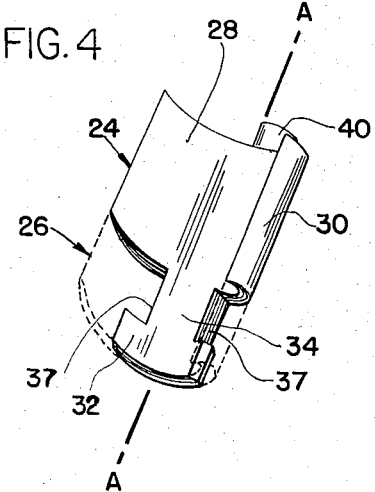
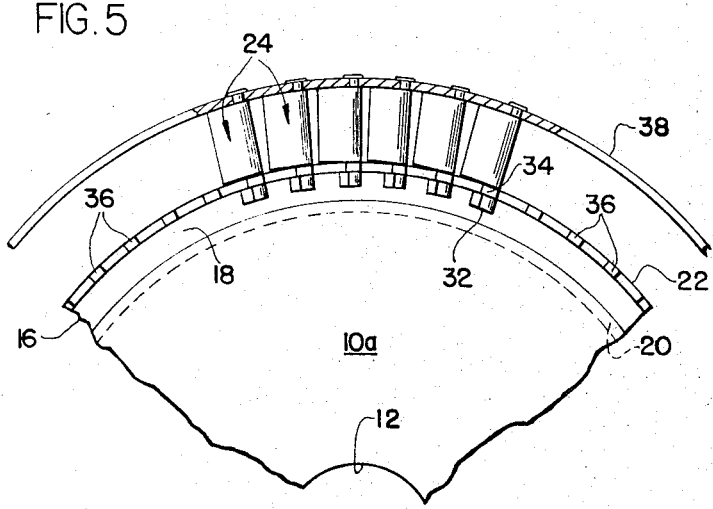

United States Patent Office 3,357,082
Patented Dec. 12, 1967

3,357,082
METHOD OF MAKING A TURBINE WHEEL
Walter E. Beaney, New London, Conn., assignor to The Whiton Machine Company, New London, Conn., a corporation of Connecticut
Filed Feb. 13, 1963, Ser. No. 258,199
1 Claim. (Cl. 29—156.8)

This invention relates to an improved turbine wheel and to the method of making the same, and it is the general object of the invention to provide a simple but sturdy and efficient wheel which can be fabricated and assembled in time saving steps to achieve economical, high production manufacture.

The drawings show a preferred embodiment of the invention and such embodiment will be described, but it will be understood thaat various changes may be made from the construction disclosed, and that the drawings and description are not to be construed as defining or limiting the scope of the invention, the claim forming a part of this specification being relied upon for that purpose.

FIG. 3 is a further detail vertical sectional view taken as indicated by the line 3—3 of FIG. 1;

FIG. 4 is an enlarged perspective view of one of the plurality of blades utilized in the turbine wheel construction; and FIG. 5 is a fragmentary view of one of the wheel disks with the blades connected thereto.

Figure 1:
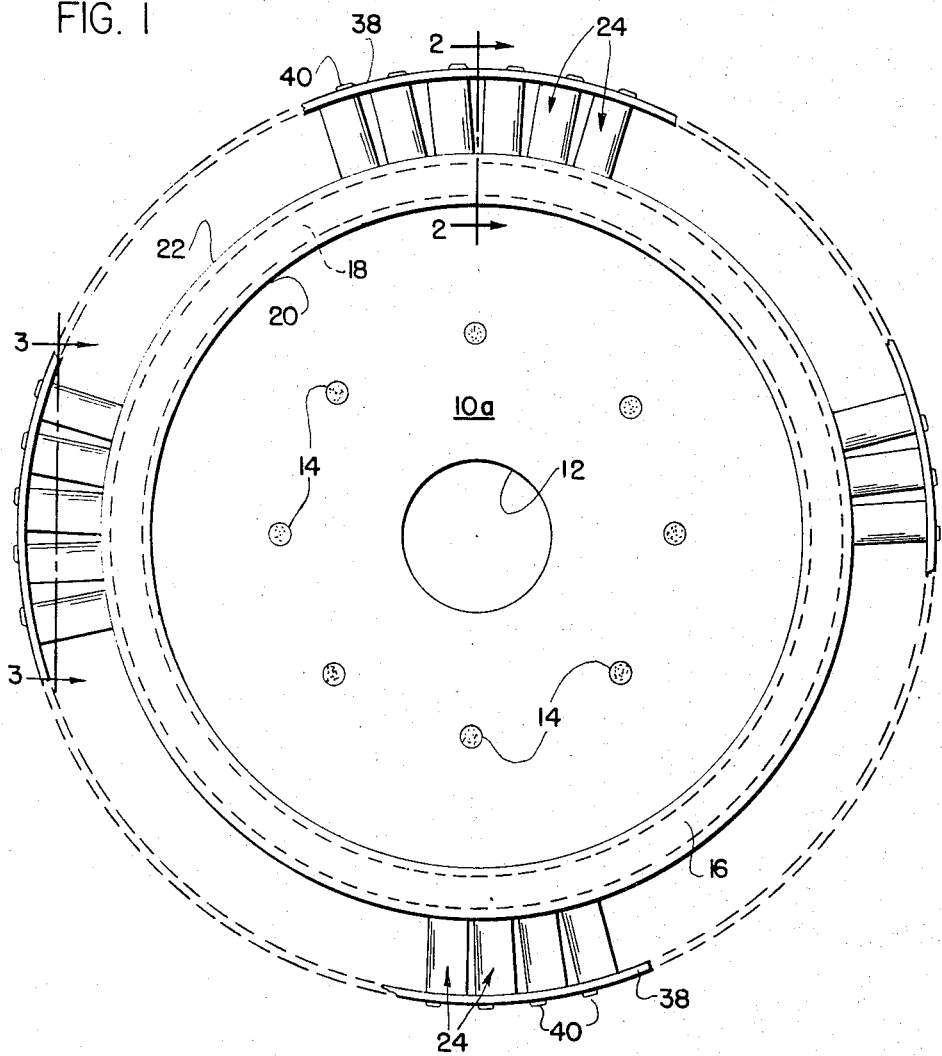
FIG. 1 is an elevational view of the turbine wheel.

The principal elements utilized in the construction of a turbine wheel in accordance with the present invention comprise a pair of disks from which the wheel body is made and a plurality of blade members from which blades are made for connection to the aforesaid disks to project radially therefrom. In the various views of the drawings the pair of wheel disks are respectively designated generally by the reference numerals 10 and 10a. Each of the said disks is provided with a circular opening 12 on its center, and in the assembly of the wheel, the disks are connected together in face to face coaxial relationship to define a common central opening 12 for assembly of the turbine wheel on a shaft which can be driven by rotation of the wheel. Preferably, the disks are connected together by spot welding at circumaxially spaced locations 14, 14 spaced outwardly from and around the central opening.

Figure 2:
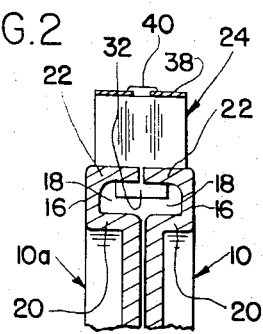
FIG. 2 is a detail vertical sectional view taken as indicated by line 2—2 of FIG. 1.

As best shown in FIG. 2, each disk is offset outwardly as shown at 16 adjacent its outer periphery. The preferred form of the offset is such that an annular recess 18 is formed in each disk, being defined by a radially inner wall 20 and a radially outer or peripheral wall 22. Each of the walls 20 and 22 extends axially or longitudinally of its respective disk, and it will be noted that the edge of each peripheral wall 22 is disposed adjacent the plane of the inner surface of the central portion of its disk. Preferably, the edge of the peripheral wall 22 terminates just short of the said plane for a purpose that will be described later.

As was mentioned earlier, the blades 24, 24 of the turbine wheel are formed from blade members. In FIG. 4 the outline of a blade member 26 is indicated by the broken lines, and it will be observed that such blade member is generally parti-cylindrical in form. That is, the blade member is formed symmetrically about a longitudinal center line A—A and is of arcuate shape transversely of the said center line having a concave front surface 28 and a convex back surface 30.

The blade 24 is formed from the blade member 26 by providing a blade shank or root 32 on one end portion of the blade member. The shank 32 is formed by reducing the transverse or arcuate extent of the blade member, and in further forming the shank a neck 34 is provided thereon. The neck 34 is defined in the shank by cutting rectangular notches 37, 37 in the longitudinal edges of the blade member. The thus formed blade 24 is secured by the disks 10 and 10a which engage the shank portion of the blade as will now be described.

In order to adapt each of the said disks to connect the blades 24, 24, a series of substantially radial rectangular notches 36, 36 is cut in the edge of its peripheral wall 22 in circumferentially spaced relationship. Each notch 36 is cut to a sufficient depth to receive substantially one-half of the neck 34 of the blade 24 with which it is to be associated. That is, the notch 36 is cut so that it will engage a longitudinal edge of a neck 34 at the corner of a side wall and the back wall of the notch while the rear surface of the neck engages the other side wall of the notch, leaving half of the neck exposed.

In the fabrication and assembly of the parts of the turbine wheel, the disks 10 and 10a are preferably stamped out on punch presses or the like in the form shown with the central opening 12 and the peripheral offset 16. Then, the notches 36 are milled or otherwise cut in the peripheral wall 22 of each disk. Then, one of the disks, such as the disk 10a shown in FIG. 5, is held in a fixture while the blades 24, 24 are connected thereto. In connecting the blades, the necks 34, 34 thereof are engaged in the notches 36, 36 of the disk so that the blade roots 32, 32 will be disposed in the annular recess 18 of the said disk. When assembling the blades, care should be taken to be certain that all of the concave surfaces 28, 28 thereof face in the same circumferential direction.

Then, the other disk 10 is placed in coaxial, face to face relationship with the disk 10a so that its notches 36, 36 similarly engage the necks of the circumferential series of blades. The engaged disks hold the blades securely to prevent movement thereof around their longitudinal center lines or axes A—A, and the engaged disks prevent radial movement of the blades relative thereto. That is, when the disks are engaged as described, their notches cooperate to define a composite rectangular opening into the composite annular recess defined by the face to face recesses 18, 18 of the respective disks. This composite recess receives the roots 32, 32 of the blades and the openings receive the necks as shown in FIG. 2.

When the disks 10 and 10a are secured together as by spot welding at the points 14, 14, they securely clamp the blades in the assembled relationship. Each disk can be made very slightly conical with an apex at its center so that the welding of the two disks together brings more clamping force to play on the blade necks by the peripheral walls which preferably do not engage each other so as to permit complete application of the said clamping force.

In further keeping with the present invention, the blades can be additionally secured in the circumferential relationship shown by connecting an encircling securing band 38 to their radially outer ends. This band can be connected as desired, but a presently preferred manner of connection involves the use of post-like projections or heads 40, 40 on the outer ends of the blades 24, 24. That is, each blade 28 is preferably formed with a radially outwardly extending head 40 which can be received within a suitable opening in the band 38 and then be peened over to secure the band 38 in place.

While the simplicity and economy of manufacture of the turbine wheel made in accordance with the present invention is readily apparent, it has an inherent advantage not so readily apparent. That is, in conventional turbine wheel construction, independent spacer elements are often used to maintain the spacing between the circumferential series of blades. The need for such spacing elements is avoided in the present construction in that precise spacing of the blades is provided for in the spacing of the notches 36, 36 in the disks 10 and 10a. These notches can be located with great precision when they are formed on machine tools, such as a milling machine, by use of an index head.

The invention claimed is:

A method of making a turbine wheel from two flat sheet metal discs, and a plurality of solid blade members having an arcuate cross section which is constant throughout their lengths, said method comprising the steps of stamping said discs to form axially offset peripheral portions, which portions are defined in part by a peripherally extending outer wall, notching said wall at peripherally spaced intervals, notching each of said blade members adjacent one of its respective ends and forming a cylindrical post-like projection on the opposite end, inserting the notched end of said blade members into the notches in one of said discs, placing the other disc over said one disc so that the notches in both discs cooperate in surrounding said blade members and so that said discs abut one another throughout substantially all of their central portions, spot welding said central portions to one another, providing a circular band with openings to receive said post-like projections, and finally securing said band to said blade members by peening over said post-like projections.

References Cited

UNITED STATES PATENTS

| | | |
|---|---|---|
| 1,074,691 | 10/1913 | Bruman. |
| 1,245,810 | 11/1917 | Smith. |
| 1,298,564 | 3/1919 | Rice. |
| 1,325,208 | 12/1919 | Rice. |
| 1,366,119 | 1/1921 | Darling. |
| 1,470,506 | 10/1923 | Steenstrup. _____ 29—156.8 |
| 1,876,067 | 9/1932 | Lorenzen _____ 253—77 |
| 2,038,670 | 4/1936 | Noack _____ 29—156.8 |
| 2,428,728 | 10/1947 | Watson. |
| 2,856,152 | 10/1958 | Kishline et al. _____ 253—39 |

JOHN F. CAMPBELL, *Primary Examiner.*

JOSEPH H. BRANSON, JR., *Examiner.*

H. F. RADUAZO, J. L. CLINE, *Assistant Examiners.*